United States Patent
Barforoshi

(10) Patent No.: US 7,347,625 B2
(45) Date of Patent: Mar. 25, 2008

(54) GROOVING IN FDB MOTOR CAPILLARY SEAL

(75) Inventor: Khalil H. Barforoshi, Milpitas, CA (US)

(73) Assignee: Seagate Technology LLC, Scotts Valley, CA (US)

(*) Notice: Subject to any disclaimer, the term of this patent is extended or adjusted under 35 U.S.C. 154(b) by 20 days.

(21) Appl. No.: 11/014,526

(22) Filed: Dec. 15, 2004

(65) Prior Publication Data

US 2006/0126981 A1 Jun. 15, 2006

(51) Int. Cl.
*F16C 32/06* (2006.01)
(52) U.S. Cl. .................. 384/132; 384/119
(58) Field of Classification Search ............ 384/132, 384/119; 310/90; 360/99.08, 98.07
See application file for complete search history.

(56) References Cited

U.S. PATENT DOCUMENTS

| 5,941,646 | A | * | 8/1999 | Mori et al. ............... 384/119 |
| 6,149,161 | A | | 11/2000 | Grantz et al. |
| 6,181,039 | B1 | | 1/2001 | Kennedy et al. |
| 6,592,262 | B2 | * | 7/2003 | Rahman ................ 384/107 |
| 6,669,369 | B1 | | 12/2003 | Nottingham et al. |
| 6,679,501 | B1 | | 1/2004 | Pelstring et al. |
| 6,760,187 | B2 | * | 7/2004 | Asada et al. ........... 360/99.08 |
| 7,001,074 | B2 | * | 2/2006 | Dittmer et al. .......... 384/107 |

* cited by examiner

*Primary Examiner*—Thomas R. Hannon
(74) *Attorney, Agent, or Firm*—Novak Druce & Quigg LLP

(57) ABSTRACT

For motors using liquid lubricated bearing surfaces, shock resistant capillary seals and lubricating liquid reservoirs are provided. The seals and reservoirs are formed by the radially opposing disposition of an inner surface of an outer member and an outer surface of an inner member. The seals and reservoirs are each oriented with one portion in fluidic communication with a bearing surface and another portion in fluidic communication with an opening in fluidic communication with an open air region of the motor. Grooving is included on at least one of the inner surface and the outer surface in a portion of the seal or the reservoir not regularly contacting lubricating liquid. During operation, if lubricating liquid splashes onto or near the grooving the grooving may help retain lubricating liquid in the seal and/or reservoir.

15 Claims, 5 Drawing Sheets

GROOVING IN FDB MOTOR CAPILLARY SEAL

BACKGROUND

1. Field

The present invention relates generally to capillary seals, and more particularly to capillary seals used between relatively rotating components in a fluid dynamic bearing system.

2. Description of Related Art

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the stability of the rotating member supporting the storage disc at one or more bearing regions with respect to a stationary member is of critical importance. One bearing design is a fluid dynamic bearing. A fluid dynamic bearing includes a bearing region formed in a gap between a fixed and a rotating member, and a lubricating liquid disposed in the gap. Fluid dynamic bearings spread the bearing interface over a large continuous surface area in comparison with a ball bearing assembly, which comprises a series of point interfaces. A larger continuous surface area reduces wobble between the rotating and fixed members.

Motors employing fluid dynamic bearings typically are open at one or more ends of the motor. To keep the lubricating liquid in the bearing region, motors include various sealing mechanisms, such as capillary seals for retaining the lubricating liquid in the bearing region during non-operation of the motor. A capillary seal typically comprises two relatively angled surfaces at the end of the gap containing the bearing region. Capillary seals may lose fluid if subject to sudden jarring. Sudden jarring can be avoided in some environments. However if disk drives having fluid dynamic bearings and capillary seals are to be used in more rugged environments, such as handheld devices, further precautions to prevent lubricating liquid loss from a capillary seal may be required.

SUMMARY

According to one aspect a capillary seal for sealing a gap between an inner member having an outer surface and an outer member having an opposing inner surface is provided. The capillary seal comprises a capillary seal region formed in the gap and in fluidic communication with a hydrodynamic bearing region. The capillary seal region has a portion proximate the hydrodynamic bearing region expected to have provided therein lubricating liquid. The capillary seal also comprises grooving formed on at least one of the inner or the outer surfaces in the capillary seal region outside of the portion expected to contain lubricating liquid. The grooving aids in keeping lubricating liquid within the capillary seal region, if upon jarring the lubricating liquid extends beyond the region expected to contain lubricating liquid.

Examples may be used as seals in spindle motors having relatively rotating inner and outer members, such as spindle motors where a hub rotates around a fixed shaft or bearing sleeve, or where a shaft rotates with respect to one or more bearing sleeves, or where a hub and a shaft are coupled and both rotate with respect to a bearing sleeve. Other aspects include methods for manufacturing and implementing aspects and examples described.

BRIEF DESCRIPTION OF THE DRAWINGS

For a fuller understanding of aspects and examples disclosed herein, reference is made to the accompanying drawings in the following description.

FIG. 3b illustrates exemplary groove patterns for use with a capillary seal as shown in FIG. 3a;

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including spindle motors for use in disc storage drives. Spindle motors for disc storage drives may be designed and may operate in a number of ways. The exemplary spindle motors provided herein are for illustrating various aspects and are not intended to limit the range of motors and devices in which in examples and aspects may be applied.

Figure 1:
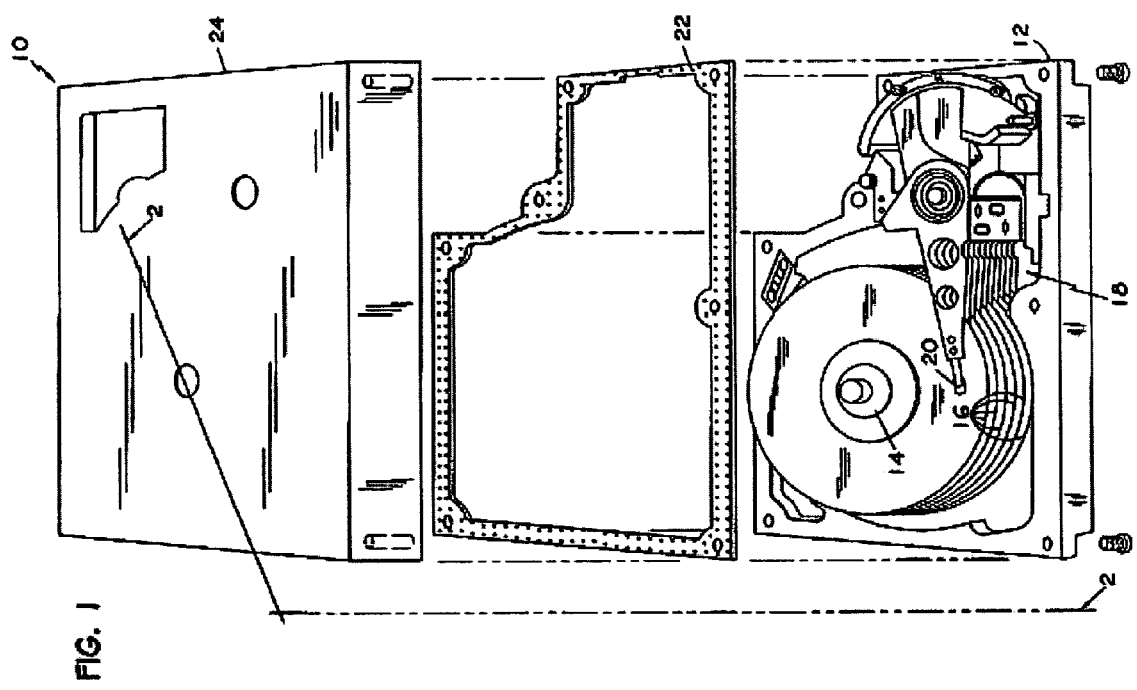
FIG. 1 illustrates an exemplary disk drive.

FIG. 1 is an exploded perspective view of a magnetic disc drive storage system. In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc.

Because spindle motor 14 rotatably supports discs 16, spindle motor 14 includes at least one low friction rotatable portion that is supported by one or more bearing surfaces. In many modern disc drives, this rotatable portion is supported by one or more hydrodynamic bearings. Hydrodynamic bearings incorporate liquid lubricants, such as oil between the rotatable portion and a fixed portion of spindle motor 14. Capillary seals help confine liquid lubricant to areas intended for lubrication.

Figure 2:
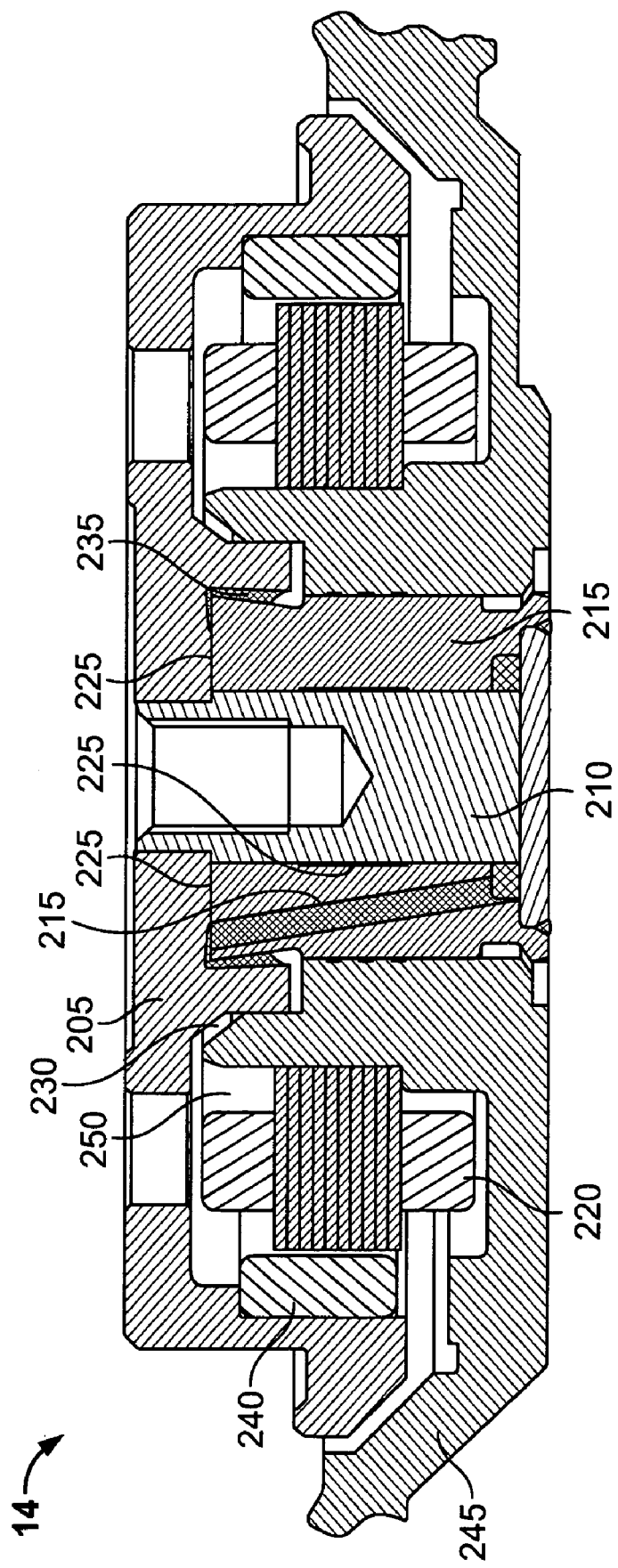
FIG. 2 illustrates a spindle motor having an exemplary vertical capillary seal with a major opening facing down.

FIG. 2 illustrates an exemplary configuration for spindle motors that incorporate hydrodynamic bearings and wherein exemplary capillary seals and reservoirs may be used. In particular, FIG. 2 illustrates a vertical cross section of a spindle motor having a hub 205 rotatably supported by shaft 210 and by hydrodynamic bearing surfaces 225. Fixed bearing sleeve 215 accepts and supports shaft 210. On an outer periphery of hub 205, a magnet 240 is disposed to face a stator 220. Open space 250 separates stator 220 from base 245 and from hub 205. A vent 230 connects open space 250 with hydrodynamic bearing region 225 through an inverted capillary seal region 235.

Capillary seal region 235 is formed between relatively tapering portions of an inner surface of hub 205 and an outer surface of bearing sleeve 215. Thus, a portion of capillary seal region 235 proximate vent 230 is larger in horizontal cross sectional area than a portion of capillary seal region 235 proximate hydrodynamic bearing region 225. Therefore, the portion of capillary seal region 235 proximate vent 230 is referred to herein as a major opening. A capillary seal in capillary seal region 235 aids in retaining lubricating liquid near hydrodynamic bearing surfaces 225 by forces generated through surface tension from the lubricating liquid in the capillary seal region 235.

Figure 3A:
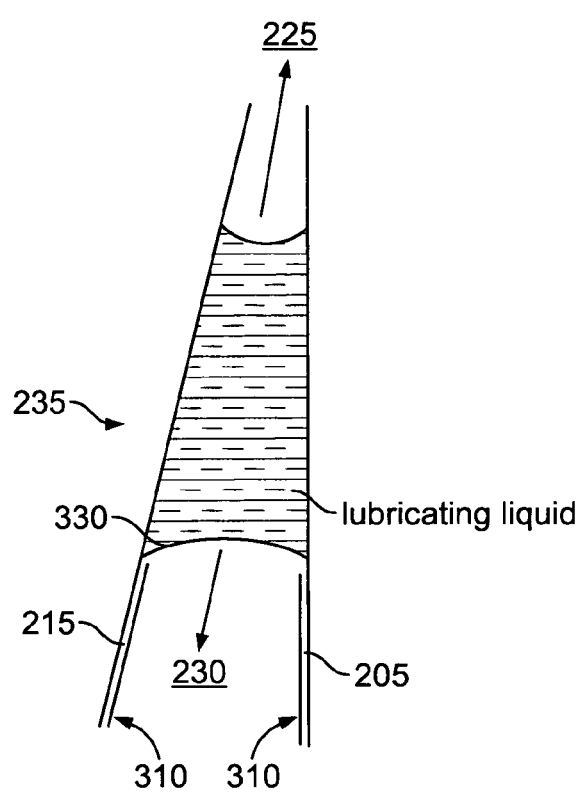
FIG. 3a illustrates a schematic vertical cross-section of an exemplary capillary seal.

With the exemplary spindle motor and capillary seal configuration of FIG. 2 in mind, FIG. 3a further illustrates a schematic cross section of capillary seal region 235 and identifies grooved region 310 of capillary seal region 235 as an exemplary area for deploying grooving according to aspects described herein. Although FIG. 3a illustrates an inverted capillary seal configuration, such as that which was described with regard to FIG. 2, the following description applies to other capillary seal configurations, such as capillary seals illustrated in FIGS. 4 and 5 and described below.

FIG. 3a illustrates a vertical cross section of two radially opposing surfaces 205 and 215 (in accordance with the example of FIG. 2) disposed to interface with each other to produce a gap with a tapering vertical cross-section, a portion of the gap having disposed therein lubricating liquid. By virtue of the amount of lubricating liquid disposed in the gap, the lubricating liquid does not entirely fill the gap and forms meniscus 330 as illustrated. The amount of lubricating liquid deposited in the gap may vary amongst motors and amongst capillary seals. Further variations may include the cross-sectional area of the capillary seal, which affects the volume of the lubricating liquid deposited therein. Designers typically determine an expected fill level of lubricating liquid in a given capillary seal for a given spindle motor under design.

The expected fill level may be an estimate that accounts for one or more of the following: temperature ranges expected in operation, errors and variations in manufacturing, variations in amount of lubricating liquid actually deposited due to assembly inaccuracies, evaporation of lubricating liquid, and other statistical, manufacturing, or processing inaccuracies, and the like. As such, the expected fill level may be specified as a range of levels or as one level along with a range of inaccuracy or variation, or as a maximum based on one or more statistical calculations, or other suitable specification. As such, an expected fill level is specified in accordance with engineering principles known to those of skill in the art.

Figure 3B:
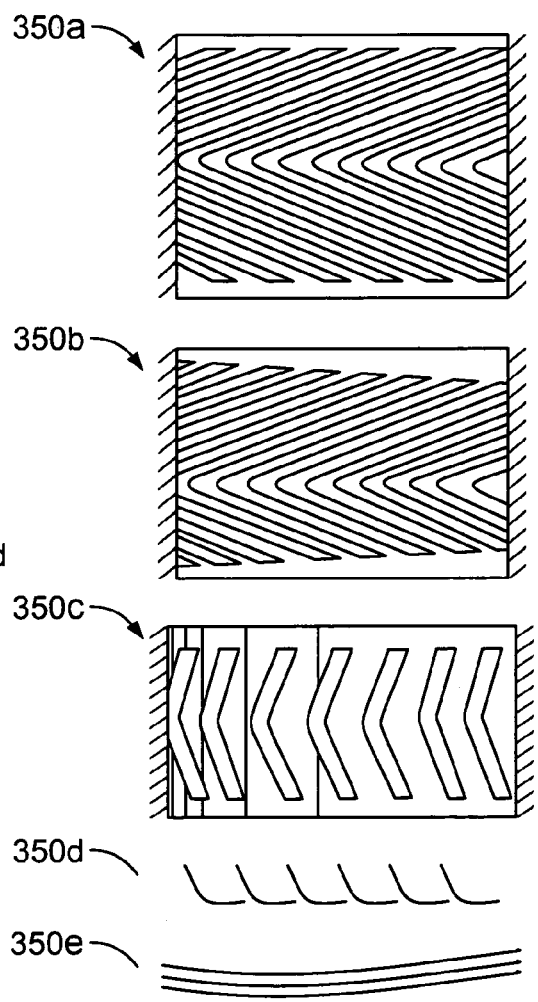

With continued reference to FIG. 3a, arrows pointing to adjacent portions of the spindle motor 14 from the capillary seal region 235 are provided to aid in orientation. Near a larger opening of the capillary seal region 235 (towards vent 230) is illustrated grooved region 310 where exemplary grooving 350 (examples 350a-e are illustrated in FIG. 3b) may be formed on one or both of radially opposing surfaces 215 and 205. As can be seen, grooved region 310 is disposed distal the exemplary meniscus 330 from the hydrodynamic bearing region 225 such that grooved region 310 would not contain lubricating liquid under normal operating conditions for spindle motor 14 containing capillary seal region 235. However, if a perturbation, such as a shock or jarring, occurs that causes the liquid to move towards grooved region 310, grooving 350 helps to contain the lubricating liquid and to deter lubricating liquid from escaping capillary seal region 235 into vent 230. As would be understood, normal operating conditions comprise a variety of conditions including variations in temperature, humidity, barometric pressure, orientation, variations in the shape of the lubricating liquid meniscus in the capillary seal, RPM changes, and the like. The disclosure and FIG. 3a are not to be construed as prohibiting contact of the grooving and the lubricating liquid under all such variations in operating conditions in the absence of shock. Rather, the description and the figures illustrate an exemplary aspect of the grooving presently described.

FIG. 3b illustrates exemplary grooving 350a-e that may be circumferentially applied to surfaces 205 and/or 215 in grooved region 310. Grooving 350, formed outside of a portion of capillary seal region 235 containing lubricating liquid, may pump to aid in opposing lubricating liquid from traveling down the relatively rotating surfaces 205 and 215 forming capillary seal region 235. Grooving such as exemplary grooving 350d and 350e may be used to pump the lubricating liquid back towards the meniscus. Chevron patterned grooving 350c may be used to pump air towards a radially opposing surface (215, 205), thereby urging a droplet of lubricating liquid that escaped the meniscus after an operating shock towards a radially opposing surface where the droplets may land on and adhere to the radially opposing surface. Asymmetrical grooving, such as grooving 350b formed in grooved region 310 may be used to pump diagonally with respect to the lengthwise direction of the capillary seal (both towards the opposing surface and towards the meniscus). Asymmetrical grooving on one radially opposing surface thus pumps to oppose the flow of droplets escaping from the meniscus and direct those droplets to the other radially opposing surface of capillary seal region 235 at a point closer to the meniscus. Other grooving may also be used in grooved region 310 based on the disclosures herein. In an example, grooving 350a-e should be formed and disposed such that it does not unduly disturb the meniscus of the lubricating liquid during normal operation.

Grooving may also be applied to other surfaces in fluidic communication with capillary seal region 235, such as surfaces forming a reservoir in fluidic communication with capillary seal region 235, even though the surfaces forming a reservoir may not relatively taper with respect to each other.

In other aspects, grooving 350 may include multiple groove patterns formed on one or more radially opposing surfaces separated by portions without groove patterns. Such grooving may be formed entirely in a capillary seal region, or entirely in a reservoir, or both in a capillary seal region and in a reservoir. Such variations and other variations and aspects are within the scope of what someone of ordinary skill would understand from the disclosure.

Figure 4:
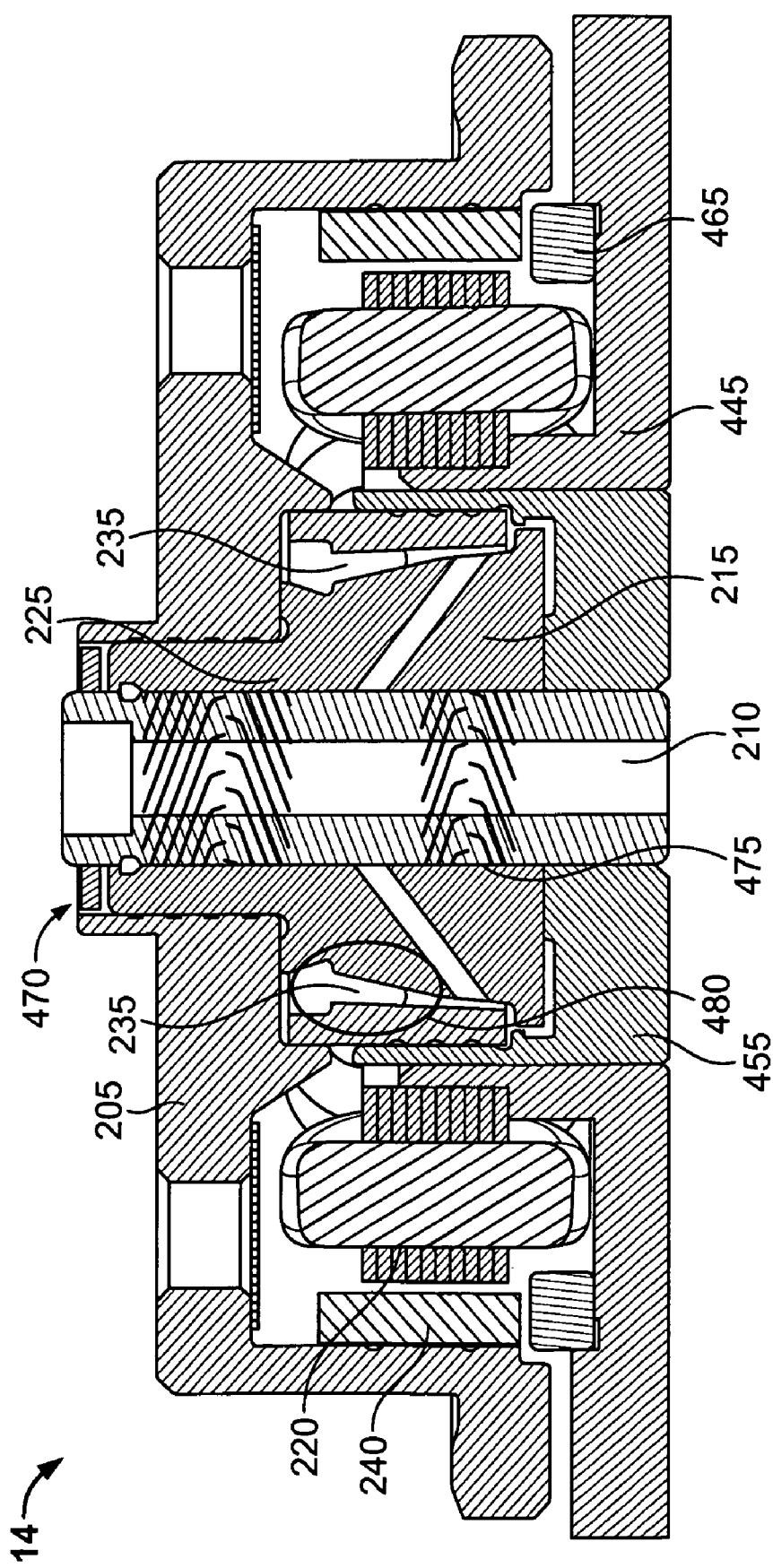
FIG. 4 illustrates a spindle motor having an exemplary vertical capillary seal with a major opening facing up.

FIG. 4 illustrates another spindle motor 14. The spindle motor 14 of FIG. 4 includes a rotatable bearing sleeve 215 coupled to hub 205. Bearing sleeve 215 is rotatably supported by a thrust cup 455 disposed beneath bearing sleeve 215. Hub 205 is biased by a magnetic interaction of a bias ring 465 fixed to base 445 and a magnet 240 fixed to hub 205. The hub 205 includes a central cap 470 to which is rotatably interfacing with shaft 210 that extends into a journal 475 formed in bearing sleeve 215. In this example, the bearing sleeve 215 coupled with hub 205 rotate with respect to shaft 210.

The outer radial surface of shaft 210 and inner radial surface of bearing sleeve 215 are disposed in proximity to each other and thereby form a hydrodynamic journal bearing (hydrodynamic bearing region 225) that reduces wobble of hub 205 while also maintaining a low friction bearing surface. During rotational operation, hydrodynamic bearing region 225 contains a liquid lubricant, such as oil.

A limiter portion 480 is disposed proximate an outer tapering surface of bearing sleeve 215. The limiter portion 480 and the tapering surface of bearing sleeve 215 form capillary seal region 235. Compared with capillary seal region 235 of FIG. 2, this capillary seal region 235 is disposed with its major opening facing up (with respect to an expected orientation of spindle motor 14) rather than down.

Figure 5:
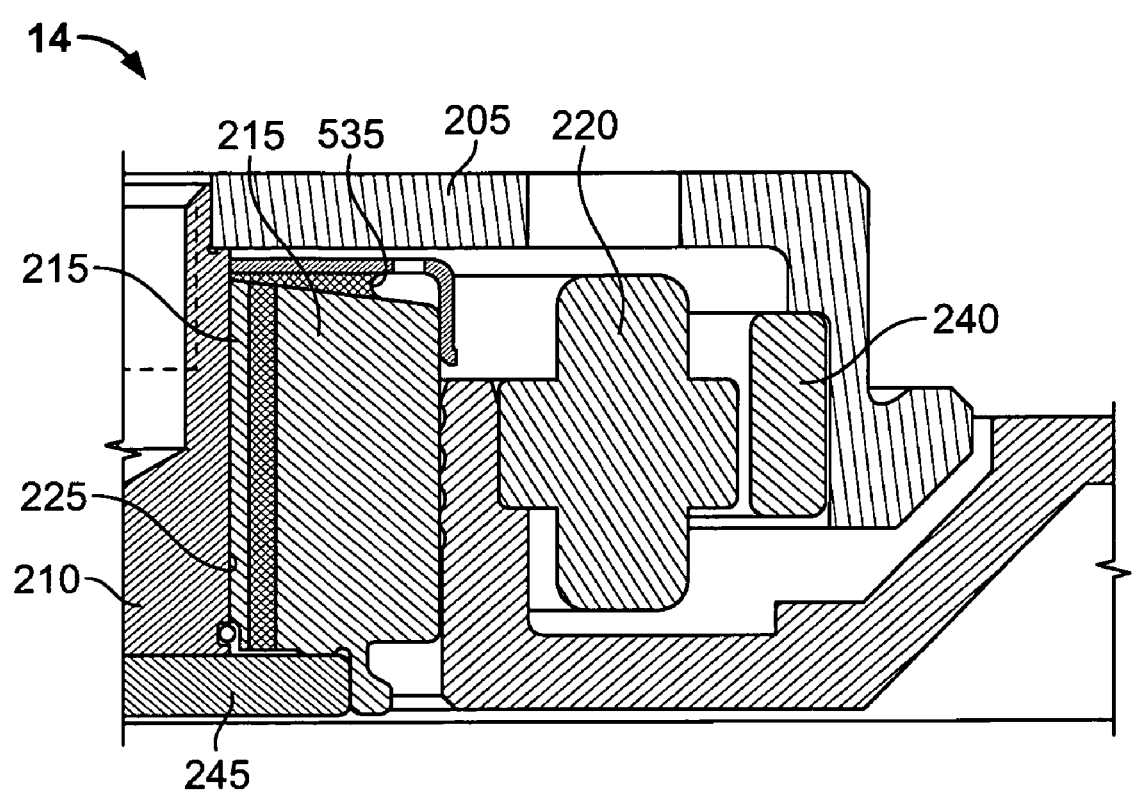
FIG. 5 illustrates an exemplary spindle motor having a capillary seal with a major opening oriented substantially parallel to an expected rotation direction of the motor.

FIG. 5 illustrates a vertical cross section of a spindle motor that includes a horizontally oriented capillary seal region 535. This spindle motor 14 also includes relatively rotatable portions (hub 205 and bearing sleeve 215) that are supported during rotational operation by hydrodynamic bearing regions sealed by capillary seal region 535. Other examples include capillary seals oriented in dispositions other than horizontal and vertical.

As illustrated in cross section in FIGS. 2-5, exemplary capillary seal region 235, 535 are formed by two relatively tapering surfaces. In some examples, one of the surfaces may be an inner surface of hub 205, and another may be an outer surface of bearing sleeve 215. By way of further example, the inner surface of the hub 205 may be straight and the outer surface of the bearing sleeve 215 may be tapered. The shape of surfaces forming capillary seals and their dispositions with respect to each other may also vary. For instance, an angle of taper, a length of capillary seal, a cross section size at the larger and at the smaller openings may also be varied.

Those of skill in the art would further understand that design parameters may include the shape of the groove pattern, the depth and angle of the groove pattern and where the groove pattern will be formed with respect to the expected fill level of the lubricating liquid in capillary seal region 235, 535. These parameters are selected based on the particular implementation being designed. For instance, designers may choose to use groove patterns that pump stronger for capillary seals in an inverted position or for centrifugal capillary seals. Groove patterns that pump more strongly may be desired for higher volume capillary seals, where surfaces forming the capillary seals may be farther apart than lower volume capillary seals. A motor expected to operate at a higher RPM may include an exemplary capillary seal having less powerful grooves, since the higher RPM may adequately pump lubricating liquid that escapes from the meniscus.

Aspects of the invention have been shown to include circumferential grooves disposed on one or more surfaces of relatively rotatable members, where the surfaces form a gap that includes a portion that has a tapering cross section and thereby form a capillary seal. Other aspects include forming grooves on opposed surfaces of radially disposed, relatively rotatable members, where those surfaces do not taper with respect to each other, so long as the circumferential grooves are appropriately disposed with respect to a fill level of the lubricating liquid. For instance, where a spindle motor includes a lubricating liquid reservoir in liquid communication with a hydrodynamic bearing region, the lubricating liquid reservoir may contain grooves on one or more surfaces that define the reservoir even though those surfaces may be substantially parallel (when viewed in cross section). The exemplary grooves are disposed on the surface(s) so that they are intended to contact lubricating liquid only if the lubricating liquid were to be perturbed.

Because capillary seals serve also to store lubricating liquid (by virtue of having a larger cross sectional area than a typical hydrodynamic bearing region), capillary seals may also be more generically considered to be lubricating liquid storage regions of a gap formed between inner and outer members disposed for relative rotation supported by a hydrodynamic bearing.

In an exemplary method of forming and assembling spindle motors having aspects herein illustrated, an inner member having an outer surface and an outer member having an inner surface are formed. The inner and outer members are formed so that upon disposition with respect to each other, the disposition would provide for relative rotation of the inner and outer members. The relative rotation would be supported during operation by a hydrodynamic bearing region formed in a gap separating the inner surface and the outer surface. The gap would include an opening where the gap is in fluidic communication with a relatively large open space (e.g., a vent opening to an area surrounding a stator), a lubricating liquid storage region, and a hydrodynamic bearing region more distal from the opening than the lubricating liquid storage region. Grooving is formed on at least one of the outer and inner surfaces in the gap at the lubricating liquid storage region. The inner and outer members are then disposed and a lubricating liquid is provided in the hydrodynamic bearing region and in a portion of the lubricating liquid storage region not containing the grooving.

This description is exemplary and it will be apparent to those of ordinary skill in the art that numerous modifications and variations are possible. For example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve the disadvantages.

I claim:

1. A motor comprising:
   an inner member and an outer member disposed for relative rotation and having respective opposing rotational surfaces, the opposing rotational surfaces defining a gap, the gap comprising:
   an opening;

a lubricating liquid reservoir region proximate the opening, the lubricating liquid reservoir region having a fill level for lubricating liquid;

a hydrodynamic bearing region more distal the opening than the lubricating liquid reservoir; and a grooving formed on at least one of the respective opposing rotational surfaces in a region of the lubricating liquid reservoir region more proximate the opening than the fill level, wherein the inner member is a fixed bearing sleeve and the outer member is a rotating hub, and wherein the fixed bearing sleeve includes a journal having therein disposed a shaft coupled to the hub.

2. The motor of claim 1, wherein the lubricating liquid reservoir region includes a tapered cross-section portion defining a capillary seal.

3. The motor of claim 2, wherein the tapering cross-section portion is disposed substantially parallel to a relative rotational direction of the inner and outer members.

4. The motor of claim 2, wherein the tapering cross-section portion is disposed substantially perpendicularly to a relative rotational direction of the inner and outer members.

5. The motor of claim 1, wherein the grooving is formed circumferentially on at least one of the respective opposing rotational surfaces.

6. A motor comprising:

an inner member and an outer member disposed for relative rotation and having respective opposing rotational surfaces, the opposing rotational surfaces defining a gap, the gap comprising:

an opening;

a lubricating liquid reservoir region proximate the opening, the lubricating liquid reservoir region having a fill level for lubricating liquid;

a hydrodynamic bearing region more distal the opening than the lubricating liquid reservoir; and a grooving formed on at least one of the respective opposing rotational surfaces in a region of the lubricating liquid reservoir region more proximate the opening than the till level, wherein the inner member comprises a bearing sleeve and a thrust cup supporting the bearing sleeve, and further comprising a base disposed around an outer diameter of the thrust cup, a bias element disposed on the base, a magnet coupled to the hub proximate the bias ring, a stator disposed proximate the magnet in a cavity formed by the base and the hub, a disc for storing information supported by the outer member, and an armature assembly movably disposed to support a transducer for reading from the disc.

7. The motor of claim 6, wherein the lubricating liquid reservoir region includes a tapered cross-section portion defining a capillary seal.

8. The motor of claim 6, wherein the grooving is formed circumferentially on at least one of the respective opposing rotational surfaces.

9. A motor comprising:

an inner member and an outer member disposed for relative rotation and having respective opposing rotational surfaces, the opposing rotational surfaces defining a gap, the gap comprising:

an opening;

a lubricating liquid reservoir region proximate the opening, the lubricating liquid reservoir region having a fill level for lubricating liquid and further including a tapered cross-section portion defining a capillary seal, wherein the tapered cross-section portion is disposed substantially perpendicularly to a relative rotational direction of the inner and outer members;

a hydrodynamic bearing region more distal the opening than the lubricating liquid reservoir; and a grooving formed on at least one of the respective opposing rotational surfaces in a region of the lubricating liquid reservoir region more proximate the opening than the fill level.

10. The motor of claim 9, wherein the inner member is a fixed shaft and the outer member is a rotating bearing sleeve, and wherein the rotating bearing sleeve supports a hub, the hub for supporting a storage disc.

11. The motor of claim 9, wherein the grooving is formed circumferentially on at least one of the respective opposing rotational surfaces.

12. The motor of claim 9, wherein the inner member is a fixed bearing sleeve and the outer member is a rotating hub, and wherein the fixed bearing sleeve includes a journal having therein disposed a shaft coupled to the hub.

13. A method for manufacturing a motor, comprising:

forming an inner member having an outer surface and an outer member having an inner surface, the inner and outer members formed for a disposition that provides for relative rotation of the inner and outer member, and a gap between the inner surface and the outer surface, the gap including an opening, a lubricating liquid storage region, and a hydrodynamic bearing region more distal from the opening than the lubricating liquid storage region;

forming grooving on either the outer surface of the inner member or the inner surface of the outer member, the grooving formed so that upon disposition of the inner and outer members the grooving is within the lubricating liquid storage region;

forming other grooving on the one of the outer surface of the inner member or the inner surface of the outer member not having already formed thereon the grooving;

disposing the inner and outer members; and providing a lubricating liquid in the hydrodynamic bearing region and in a portion of the lubricating liquid storage region not having the grooving.

14. The method of claim 13, wherein the grooving includes one or more of a chevron, herringbone, or spiral groove patterns.

15. The method of claim 13, wherein the lubricating liquid storage region includes a capillary seal region.

* * * * *